United States Patent [19]

Billmers et al.

[11] Patent Number: 5,797,984
[45] Date of Patent: Aug. 25, 1998

[54] WATER RESISTANT STARCH BASED FOAMS

[75] Inventors: Robert L. Billmers, Stockton; Paul A. Altieri, Belle Mead, both of N.J.

[73] Assignee: National Starch and Chemical Investment Holding Corporation, Wilmington, Del.

[21] Appl. No.: 838,100

[22] Filed: Apr. 15, 1997

[51] Int. Cl.⁶ .................. C08B 31/04; C09D 103/06; C08L 3/06
[52] U.S. Cl. .................. 127/33; 106/207.1; 536/110; 127/71
[58] Field of Search ............ 536/110; 127/33, 127/71; 126/207.1

[56] References Cited

U.S. PATENT DOCUMENTS

| | | | |
|---|---|---|---|
| 2,461,139 | 2/1949 | Caldwell | 127/33 |
| 2,613,206 | 10/1952 | Caldwell | 536/110 |
| 2,661,349 | 12/1953 | Caldwell et al. | 536/63 |
| 4,061,610 | 12/1977 | Glowasky et al. | 524/51 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,554,660 | 9/1996 | Altieri et al. | 521/81 |
| 5,587,412 | 12/1996 | Borchers et al. | 524/47 |
| 5,672,699 | 9/1997 | Billmers et al. | 536/102 |
| 5,731,430 | 5/1998 | Fuertes et al. | 536/58 |

FOREIGN PATENT DOCUMENTS

| 688291 | 3/1953 | United Kingdom | 127/33 |
|---|---|---|---|

OTHER PUBLICATIONS

*Chemical Abstracts*, 109137x, vol. 120, 1994, T. Nakao, "Surface-Treated Starch Foams", (no month avail).

*Primary Examiner*—David Brunsman
*Attorney, Agent, or Firm*—Eugene Zagarella, Jr.

[57] ABSTRACT

Biodegradable, expanded starch products are provided having increased resistance to water and high humidity and comprising low DS hydrophobic starch derivatives having the formula:

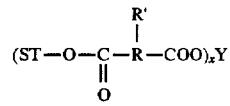

where ST is starch, R is a dimethylene group, R' is a substituent hydrocarbon having 10 to 16 carbon atoms, Y is a metal, x is an integer equal to the valence of Y and derivative or ester group has a DS of from about 0.03 to 0.12.

20 Claims, No Drawings

WATER RESISTANT STARCH BASED FOAMS

BACKGROUND OF THE INVENTION

This invention relates to expanded or foamed starch products having increased resistance to water and high humidity and comprising selected low DS (degree of substitution) hydrophobic starch derivatives.

The ability to provide expanded products using starch materials has recently taken on increased interest because of the biodegradable nature of such materials. This biodegradable attribute possessed by starch lends itself to the formation of products which are environmentally safe and friendly.

Despite the known biodegradable characteristics of starch, it has not been easy to convert starch based materials into foamed structured products because it lacks some of the physical properties needed, particularly under high humidity conditions, or when in contact with water.

The use of starch and derivatives thereof to form various shaped articles has been shown in a number of recent patent publications. U.S. Pat. Nos. 5,035,930 and 5,043,196 issued on Jul. 30, 1991 and Aug. 27, 1991, respectively, disclose foamed shaped products formed from high amylose starch and particularly alkylene oxide modified starch. U.S. Pat. No. 5,095,054 issued on Mar. 10, 1992 discloses shaped articles having dimensional stability and enhanced physical properties that are made from a thermoplastic polymer composition comprising a destructurized starch and a hydrophobic, water insoluble polymer or compound having one or more functional groups. Biodegradable foamed shaped products formed from a melt comprising high DS starch esters of greater than 1.5 and especially 1.8 to 2.9 are disclosed in U.S. Pat. No. 5,587,412 issued Dec. 24, 1996.

Water resistance has been obtained in starch based foams by using starch modified with high levels of $C_2$ to $C_8$ acid anhydride such as acetic and propionic anhydride as disclosed in U.S. Pat. No. 5,554,660 issued Sep. 10, 1996. The high treatment levels for these starches can change the physical properties and adversely effect biodegradability.

Another approach to provide water resistance is disclosed in a publication to T. Nakao et al., Chem. Abstracts 109137X, Vol. 120 (1994) where starch foams were coated with polycaprolactone. This technique will only provide water resistance if the piece is not broken or damaged and also requires multi-steps to produce the final product.

Despite the known disclosures of starch foams and water resistant products thereof, there still remains the need and desire to provide additional water resistant starch foam products. It is particularly desired to develop a water resistant product where lower amounts of reagent can be used thereby providing a simpler, more economical process and also one that results in products that are more environmentally friendly and have good mechanical properties such as cushioning, resiliency and flexibility.

SUMMARY OF THE INVENTION

This invention is directed to biodegradable expanded starch products having improved water and humidity resistance properties and comprising low DS hydrophobic starch derivatives.

More particularly, this invention relates to an expanded, water and humidity resistant, starch product comprising a hydrophobic starch derivative having the following formula:

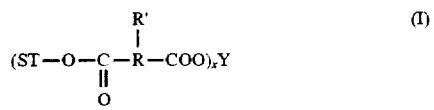

where ST is the starch base material, R is a dimethylene group, R' is a substituent hydrocarbon group having 10 to 16 carbon atoms, Y is a metal, x is an integer equal to the valence of Y and the derivative or ester group having a DS (degree of substitution) of from about 0.03 to 0.12.

DETAILED DESCRIPTION OF THE INVENTION

The ability to provide expanded starch products having improved water and humidity resistant properties is attained by using a selected low DS hydrophobic starch derivative.

The starch derivatives of this invention have the formula 1, shown above, where ST is the starch base material, R is dimethylene, R' is a hydrocarbon group having 10 to 16, preferably 12 to 14 carbon atoms, Y is a metal, more particularly a polyvalent or multivalent metal, preferably a di- or tri-valent metal, and x is an integer equal to the valence of Y, more particularly 2 to 4, preferably 2 to 3. The derivative or ester group on the starch compound I will have a degree of substitution (DS) of from about 0.03 to 0.12, preferably from about 0.05 to 0.08. The term "degree of substitution" (DS) as used herein indicates the average number of sites per anhydroglucose unit of the starch molecule on which there are substituent groups. The hydrocarbon or hydrophobic substituent group R' may be alkyl, alkenyl, aryl, aralkyl or aralkenyl, preferably alkyl or alkenyl and more preferably alkenyl. The metal Y will preferably be a di- or trivalent metal having an atomic weight of less than about 70 and more preferably is calcium, magnesium or aluminum.

The base starch material used herein may be any of several starches, native or converted. Such starches include those derived from any plant source including corn, potato, wheat, rice, sago, tapioca, waxy starches such as waxy maize, waxy potato and waxy rice, sorghum and high amylose starch such as high amylose corn, i.e., starch having at least 40% and more particularly at least 65% amylose content by weight. Starch flours may also be used. Also included are the conversion products derived from any of the former basis such as, for example, dextrins prepared by hydrolytic action of acid and/or heat, fluidity or thin boiling starches prepared by enzyme conversion or mild acid hydrolysis, and oxidized starches prepared by treatment with oxidants such as sodium hypochlorite. Also included in the starting starch materials are derivatized starches, e.g., alkylene oxide modified starches (e.g., up to 15% by weight of those containing 2 to 6 carbon atoms), cationic and anionic starches, and crosslinked starches such as those crosslinked with epichlorohydrin and phosphorus oxychloride. Preferred starches are the amylose containing starches, i.e., starches containing at least 5% by weight amylose content, and more preferred are the high amylose starches having greater than 40% by weight amylose content because of the mechanical property advantages they provide.

While the preparation of starch derivatives including hydrophobic derivatives have been carried out for many years, as noted above, the ability to provide longer chain products such as those of this invention has not been easy. In some cases, particularly in aqueous systems, the starch and reagent will not react because of the limited solubility in water. An improved method for preparing the hydrophobic derivatives of this invention is disclosed in U.S. application Ser. No. 08/524,281, filed Sep. 6, 1995, now U.S. Pat. No. 5,672,699, wherein the starch and anhydride reagent are predispersed or intimately contacted by mixing at low acidic pH before being brought to reaction conditions. More particularly, this method involves reacting starch with an organic acid anhydride in an aqueous system wherein:

a) starch is slurried in water at an acid pH of less than 7.0;

b) an organic acid anhydride having the desired R and R' substituent groups (as in formula I above) is added to the slurry;

c) the starch and anhydride reagent are intimately contacted by mixing to form a stable dispersion;

d) alkali material is added to the starch dispersion to adjust the pH to an alkaline pH of greater than 7.0 to initiate reaction and further adding alkali material to maintain that pH until the reaction is complete; and e) metal salt added in either dry form or aqueous solution.

This method of preparing the hydrophobic starch derivatives of this invention is described in the '281 application noted above, which is incorporated herein by reference. Any metal salt such as the metal salts of calcium, magnesium or aluminum, the preferred metals, may be used. Such calcium salts as calcium chloride, calcium sulfate, calcium acetate or calcium hydroxide can be used with calcium chloride or calcium sulfate being preferred. The salt can be added in any form and preferably in an aqueous solution and at a pH of less than 7.0. The amount of salt used is at least a stoichiometric amount and more particularly will be from about 2.5 to 5% by weight based on the weight of dry starch.

The expanded or foamed products of this invention are prepared using an extrusion process. The formed product is an expanded, closed cell material of relatively low density with good flexibility and/or rigidity as well as resilience and compressibility. The uniform closed cell structure of the expanded product helps to give it desired properties. A closed cell structure is defined as one having largely non-connecting cells, as opposed to open cells which are largely interconnecting or defined as two or more cells interconnected by broken, punctured or missing cell walls. Typically, the tiny bubble formation results in a small cell size of about 50 to 1000 microns.

Generally, properties of the expanded, foamed product will vary widely with the bulk density of the product being from about 0.2 to 16 lb/ft$^3$, the resiliency of at least 20% and the compressibility from about 100 to 800 g/cm$^2$. Methods for determining these properties can be found in U.S. Pat. No. 5,043,196 issued Aug. 27, 1991, which is incorporated by reference herein.

The expanded shaped products of this invention are prepared using an extrusion process. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder. Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Different dies and die configurations may be used in the extruder and extrusion depending on the particular form of the expanded starch product that is desired. Annular or tubular dies are one suitable type that can be used.

Variations in any of the elements used in the extruder may be made as desired in accordance with conventional design practices. A further description of extrusion and typical design variations can be found in "Encyclopedia of Polymer Science and Engineering", Vol. 6, 1986, pp. 571 to 631.

In carrying out the extrusion process, temperatures in the extruder will vary depending on the particular material, desired properties and application. They can generally range from about 100° to 250° C. and preferably from about 150° to 210° C. The total moisture content of the starch in the extruder, i.e., residual moisture present in starch feed plus water added during processing, will be about 25% or less by weight, based on the weight of starch. More particularly, the total moisture content of the starch will range from about 10 to 25% and preferably from about 15 to 21%.

Blends of two or more of the hydrophobic starch derivatives I may be used to prepare the expanded starch products of this invention. Additionally, blends of the hydrophobic starch derivatives I with 0 to 50% by weight of other starches, modified or unmodified, may be used. Additive or synthetic compounds may also be used in combination with the hydrophobic starch derivatives to improve properties such as strength, color, flame retardency, etc. Compounds such as polyvinyl alcohol, ethylene vinyl alcohol, polyvinyl acetate, poly(ethylene vinyl acetate), monoglycerides and styrene acrylate resins are typical additives which may be used. These additives may be used in any amount that will effectively satisfy the desired property, provided the extrusion of starch and the overall properties of the expanded product including water and humidity resistance are satisfied. Generally, from 0 to 50% by weight and preferably from 0.1 to 10% by weight of such additives, based on the weight of the composition, may be used.

Additionally, a nucleating agent or salt can be added to the starch to aid in the extrusion processing and properties of the resulting expanded product. Various nucleating agents or salts may be used in this capacity including any inorganic, water soluble salt or mixtures thereof and especially an alkaline metal or alkaline earth metal salt such as sodium sulfate and sodium chloride. Other nucleating agents such as microtalc can also be used. The amount of nucleating agent used will depend on the particular processing conditions and desired product with amounts of about 1 to 8% and more particularly 2 to 5% by weight, based on the weight of starch, being found suitable.

This invention is further illustrated by the following examples with all parts and percentages given by weight and all temperatures in degrees Celsius unless otherwise noted.

EXAMPLE I

A total of 1 kg of Hylon VII starch (a product of National Starch and Chemical Company, containing 70% by weight amylose) was placed in a 4 liter Warring blender and 2 liters of water added. The slurry was mixed at low speed until homogeneous and the pH adjusted to between 2–3 adding hydrochloric acid. A total of 15 grams of dodecenyl succinic anhydride (DDSA) was added quickly and the slurry mixed at high speed for one minute. The slurry was then placed in a stainless steel beaker in a constant temperature bath set at 35° C. and equipped with overhead motor and stirring paddle, pH electrode and dip tube for automatic addition of 3% aqueous sodium hydroxide. The automatic pH controller was set at 8.5 and reaction was continued until consumption of caustic stopped (i.e., less than 5 grams of caustic solution per hour). The reaction pH was adjusted to 5.5 with HCl and filtered. The resulting cake was washed with 2 L of water and resuspended into 2 L of fresh water followed by the addition of 45 g of $CaCl_2$ (see Table I) and stirred for 1 hour. The slurry was filtered and washed (3×2 L) and allowed to air dry. This product had a DS of 0.05 and was expanded into a starch foam product and evaluated along with other similarly prepared starch samples as identified in Example III (sample 2), Table I below.

EXAMPLE II

Several additional starch derivative samples were prepared as in Example I using Hylon VII starch (70% by weight amylose) hydroxypropylated with 7% by weight propylene oxide. Various amounts of the derivatizing group and between 15 and 45 g of $CaCl_2$ were used (see Table I). The samples, identified as samples 3 to 11, were extruded relative humidity (RH) for 5 days and then tested for water resistance and shrinkage. Water resistance of the products was determined by direct contact with water. Products of similar size was placed in water and the time for which it begins to disintegrate or fall apart and lose its structural integrity measured. The amount of shrinkage for the products was measured after exposure to high temperature/high humidity conditions, i.e., 90° F./90° RH (relative humidity) for 48 hours. Measurements were also made to determine bulk density, resiliency and compressibility. Bulk density was determined using the volume replacement method described by M. Hwang and K. Hayakawa in "Bulk Densities of Cookies Undergoing Commercial baking Processes", Journal of Food Science, Vol. 45, 1980, pp. 1400–1407 and further described in U.S. Pat. No. 5,043,196 issued Aug. 27, 1991. The resiliency and compressibility were determined using a Stevens LFRA Texture Analyzer as described in the aforesaid '196 patent using a 2 mm probe distance. These methods for determining bulk density, resiliency and compressibility as disclosed in the noted U.S. Pat. No. 5,043,196 are incorporated herein by reference. All results are shown below in Table I.

TABLE I

| Sample No. | Description | DS | % Shrinkage | Water Resistance (Sec) | Bulk Density (lb/ft³) | 23° C./50% RH (48 hours) | |
|---|---|---|---|---|---|---|---|
| | | | | | | % Resiliency | Compressibility |
| 1 | Control[1] | — | 41 | 9 | 1.34 | 56.74 | 625 |
| 2 | DDSA[2], 4.5% CaCl | 0.05 | 8 | 1200 | — | 63.4 | 34 |
| 3 | DDSA[3], 1.5% $CaCl_2$ | 0.03 | 24 | 12 | 1.06 | 58.35 | 341 |
| 4 | DDSA[3], 3% $CaCl_2$ | 0.03 | 20 | 16 | 0.96 | 57.37 | 306 |
| 5 | DDSA[3], 4.5% $CaCl_2$ | 0.03 | 21 | 25 | 0.95 | 59.21 | 344 |
| 6 | DDSA[3], 1.5% $CaCl_2$ | 0.055 | 27 | 29 | 1.02 | 59.68 | 328 |
| 7 | DDSA[3], 3% $CaCl_2$ | 0.055 | 25 | 28 | 1.02 | 60.35 | 371 |
| 8 | DDSA[3], 4.5% $CaCl_2$ | 0.055 | 16 | 35 | 0.95 | 59.24 | 314 |
| 9 | DDSA[3], 1.5% $CaCl_2$ | 0.075 | 20 | 145 | 1.07 | 58.81 | 418 |
| 10 | DDSA[3], 3% $CaCl_2$ | 0.075 | 11 | 573 | 1.26 | 61.7 | 447 |
| 11 | DDSA[3], 4.5% $CaCl_2$ | 0.075 | 15 | 3488 | 1.13 | 60.64 | 410 |

[1]Hylon VII starch (70% amylose) modified with 7% propylene oxide
[2]DDSA (dodecenyl succinic anhydride) with Hylon VII starch (70% amylose)
[3]DDSA (dodecenyl succinic anhydride) with Hylon VII starch (70% amylose) modified with 7% propylene oxide into starch foam products and evaluated along with the derivative of Example I as described and shown in Example III (see Table I below).

EXAMPLE III

The starch derivative sample prepared in Example I, along with several other similarly prepared starch derivatives described in Example II, were extruded into foam structures and tested as described below.

The starch samples were extruded in a twin screw extruder at 16 to 20% total moisture into expanded starch foam products which were cut as they exited from the die. The products were collected, allowed to equilibrate at 50%

EXAMPLE IV

Blends of starch derivatives, prepared in Examples I and II, with other starches were made and extruded into starch foam products as in Example III. A 20/80 (% by weight) blend of the dodecenyl succinic anhydride (DDSA) treated Hylon VII starch (as in Example I, sample 2) with hydroxypropylated Hylon VII starch (7% by wt. of propylene oxide) was extruded and tested as in Example III. The resulting product had a 31% shrinkage after 48 hours and water resistance of 20 seconds. A 50/50 (% by weight) blend of the same starch components resulted in a foamed product having a shrinkage of 22% and water resistance of 300 seconds.

A further blend (20/80) of DDSA treated Hylon VII hydroxypropylated starch (Example II, sample 10) with hydroxypropylated Hylon VII starch was extruded and tested as in Example III with the foamed product having 38% shrinkage and water resistance of 38 seconds. A 50/50 blend of the same two starch materials resulted in a product having 28% shrinkage and water resistance of 840 seconds.

The blended products, which contained the hydrophobic starch derivatives of this invention, showed reduced shrinkage and improved water resistance when compared with a control product made from hydroxypropylated Hylon VII starch. The control product had a shrinkage of 41% and water resistance of 10 seconds.

What is claimed is:

1. A biodegradable, water and humidity resistant starch product comprising a hydrophobically modified starch having the formula:

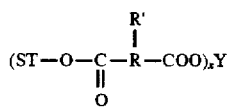

where ST is starch, R is a dimethylene group, R' is a hydrocarbon group having 10 to 16 carbon atoms, Y is a metal, x is an integer equal to the valence of Y and the derivative or ester group has a DS of from about 0.03 to 0.12.

2. The product of claim 1 wherein the starch is an amylose containing starch having at least 5% by weight of amylose content.

3. The product of claim 1 wherein the starch contains at least 65% by weight of amylose content.

4. The product of claim 1 wherein R' is an alkyl, alkenyl, aryl, aralkyl or aralkeny group and x is 2 to 4.

5. The product of claim 4 wherein Y is a divalent or trivalent metal and x is 2 to 3.

6. The product of claim 5 wherein the starch is an amylose containing starch having at least 5% by weight of amylose content.

7. The product of claim 6 wherein R' has 12 to 14 carbon atoms.

8. The product of claim 7 wherein Y is calcium, magnesium or aluminum and x is 2.

9. The product of claim 8 wherein the starch contains at least 65% by weight of amylose content.

10. The product of claim 7 wherein R' is an alkenyl group, Y is calcium and x is 2.

11. The product of claim 10 wherein the starch contains at least 65% by weight of amylose content.

12. The product of claim 11 wherein the DS of the ester group is from about 0.05 to 0.08.

13. The product of claim 11 wherein the starch is further modified with alkylene oxide containing 2 to 6 carbon atoms.

14. The method of preparing the starch product of claim 1 wherein the starch is expanded by extrusion.

15. The method of claim 14 wherein the starch is an amylose containing starch having at least 5% by weight of amylose content, and R' is an alkyl, alkenyl, aryl, aralkyl or aralkenyl group.

16. The method of claim 15 wherein Y is a divalent or trivalent metal and x is 2 to 3.

17. The method of claim 16 wherein R' has 12 to 14 carbon atoms, Y is calcium, magnesium or aluminum and x is 2.

18. The method of claim 17 wherein the starch contains at least 65% by weight of amylose content.

19. The method of claim 18 wherein R' is an alkenyl group and Y is calcium.

20. The method of claim 19 wherein the DS of the ester group is 0.05 to 0.08.

* * * * *